United States Patent [19]

Suzuki

[11] 4,301,481
[45] Nov. 17, 1981

[54] OPERATION MODE SWITCHING SYSTEM FOR TAPE RECORDER

[75] Inventor: Shigeru Suzuki, Hamamatsu, Japan
[73] Assignee: Nippon Gakki Seizo Kabushiki Kaisha, Hamamatsu, Japan
[21] Appl. No.: 62,805
[22] Filed: Aug. 1, 1979
[30] Foreign Application Priority Data
  Aug. 8, 1978 [JP] Japan .............. 53-108532[U]
[51] Int. Cl.³ .................. G11B 15/12; G11B 15/48
[52] U.S. Cl. .................... 360/62; 360/74.1
[58] Field of Search ............ 360/62, 60, 74.1; 242/204

[56] References Cited
U.S. PATENT DOCUMENTS
  3,591,186  7/1971  Murata ............... 360/62
  4,130,843  12/1978 Miyamoto ............ 360/62
  4,152,732  5/1979  Weis ................ 360/62

OTHER PUBLICATIONS
Specification Sheet on Nakamishi 700, tri-tracer 3 head cassette deck, 8/73.

*Primary Examiner*—Aristotelis M. Psitos
*Attorney, Agent, or Firm*—Frishauf, Holtz, Goodman & Woodward

[57] ABSTRACT

An operation mode switching system for a tape recorder in which the tape recorder is set to a recording-pause mode by operating a REC. STBY. (recording stand-by) key when the tape recorder is in a stop mode, set to a recording mode by operating a PLAY key when the tape recorder is in the recording-pause mode, and set to a playback mode by operating the PLAY key when the tape recorder is in a stop, fast-forward or rewinding mode.

8 Claims, 3 Drawing Figures

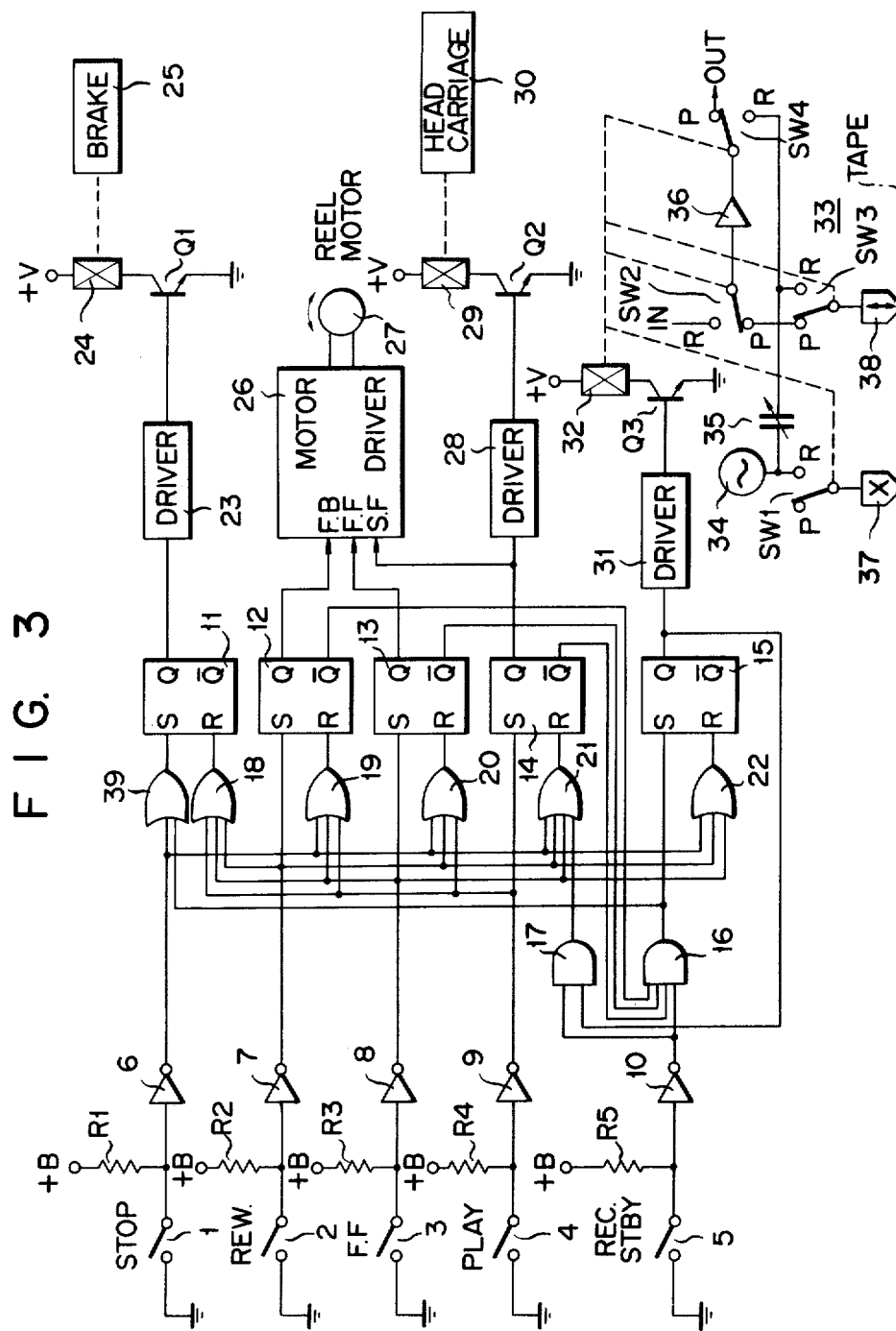
F I G. 3

OPERATION MODE SWITCHING SYSTEM FOR TAPE RECORDER

BACKGROUND OF THE INVENTION

This invention relates to a tape recorder, and more specifically to an operation mode switching system for a tape recorder.

A variety of operation mode switching systems are used in cassette decks or tape recorders that are currently commercially available. Among several operation modes of the conventional system, the recording mode and recording-pause mode generally require three function-control or operation keys or push buttons to be operated for setting these modes. The operating manner for setting these modes has not been standardized. Therefore, users sometimes have difficulty in recording and are even confused by the present situation whereby every tape recorder has its own manner of recording.

Referring to FIG. 1 showing an example of an operation mode switching device that has conventionally been in general use, there are provided operation switches operated by means of six push buttons or keys labelled as STOP, F.F., REW., PLAY, REC. and PAUSE. Electrical signals obtained by operating these switches are supplied to an electronic logic circuit which performs functions including head carriage operation, brake operation, reel motor control, and playback circuit/recording circuit switching operation. Table I shows the relationship between the specific functions achieved by the electronic logic circuit and the operation keys, while Table II shows the operation modes achieved by succeeding actuation of the respective operation keys in each operation mode.

TABLE I

| | FUNCTIONS | | | |
|---|---|---|---|---|
| KEYS | HEAD CAR. OPERATION | BRAKE OPERATION | REEL MOTOR CONTROL | PLAY/REC. SWITCHING OPERATION |
| STOP | RELEASE | OPERATE | STOP | PLAYBACK |
| F.F. | RELEASE | RELEASE | FAST-FORWARD | PLAYBACK |
| REW. | RELEASE | RELEASE | FAST-BACKWARD | PLAYBACK |
| PLAY | OPERATE | RELEASE | SLOW-FORWARD | PLAYBACK |
| REC. | — | — | — | RECORD |
| PAUSE | OPERATE | OPERATE | STOP | PLAY OR RECORD |

TABLE II

| | MODE | | | | | | |
|---|---|---|---|---|---|---|---|
| KEYS | STOP | F.F | REW. | PLAY-BACK | PLAY BACK PAUSE | RECORD | RECORD PAUSE |
| STOP | STOP | STOP | STOP | STOP | STOP | STOP | STOP |
| F.F | F.F | F.F | F.F | F.F | F.F | F.F | F.F |
| REW. | REW. | REW. | REW. | REW. | REW. | REW. | REW. |
| PLAY | PLAY | PLAY | PLAY | PLAY | PLAY | RECORD | RECORD |
| REC. | STOP | F.F | REW. | PLAY | PLAY PAUSE | RECORD | RECORD PAUSE |
| PAUSE | STOP | F.F | REW. | PLAY PAUSE | PLAY PAUSE | RECORD PAUSE | RECORD PAUSE |

With an operation mode switching system as described above, the following procedures are required for a recording operation.

(1) The PAUSE, REC. and PLAY keys are set at the same time or firstly PAUSE key and then REC. and PLAY keys are set, whereby the tape recorder is brought to the recording-pause mode for level setting of a record input signal.

(2) The PAUSE key is released to provide the recording mode.

(3) The PAUSE key is set and reset as required, whereby the recording-pause mode and the recording mode are alternately repeated.

(4) The STOP key is set at the end of the recording operation, whereby the recording is finished and the tape recorder is brought to the stop mode.

Thus, the selection of the recording-pause mode (1) requires operations of three keys—PAUSE, REC. and PLAY, which would be troublesome.

SUMMARY OF THE INVENTION

An object of this invention is to provide a tape recorder which facilitates carrying out a recording operation.

Another object of this invention is to provide a tape recorder with a reduced number of operation keys for operation mode switching as compared with conventional tape recorders.

A tape recorder according to this invention is provided with a first operation key (herein referred to as REC. STBY. key), a second operation key (PLAY), and an electronic logic circuit. The electronic logic circuit is so arranged as to set the tape recorder to a recording-pause mode in response to an operation of the first operation key when the tape recorder is in a stop mode, to a recording mode in response to an operation of the second operation key when the tape recorder is in the recording-pause mode, to the recording-pause mode in response to an operation of the first operation key when the tape recorder is in the recording mode, and to a playback mode in response to an operation of the second operation key when the tape recorder is in the stop mode.

Whereas prior art tape recorders have six operation keys (STOP, F.F., REW., PLAY, REC. and PAUSE), the tape recorder of this invention requires only five operation keys (STOP, F.F., REW., PLAY and REC. STBY.), thus providing easier recording operations and simple construction.

BRIEF DESCRIPTION OF THE DRAWINGS

FIG. 3 schematically shows an example of an electronic circuit of the tape recorder according to the invention.

DETAILED DESCRIPTION OF THE PREFERRED EMBODIMENT

Figure 1:
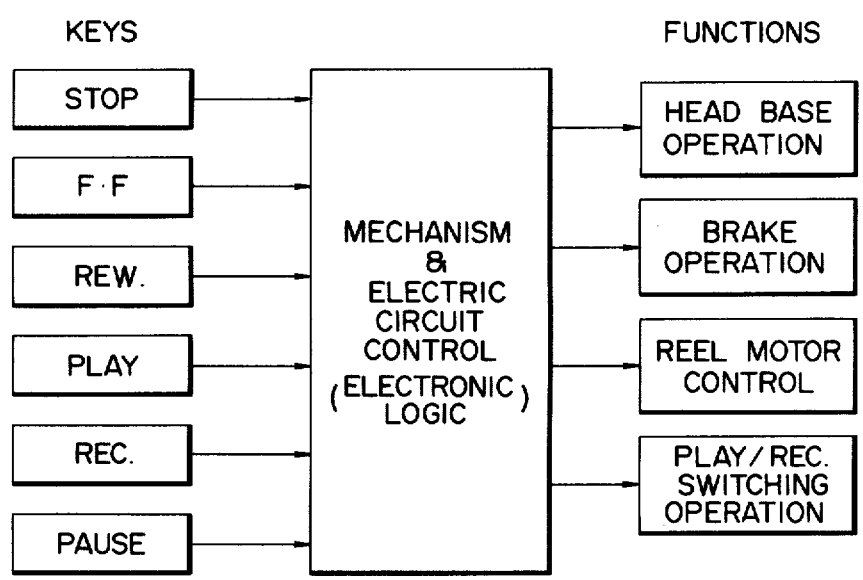
FIG. 1 shows an example of an operation mode switching system for a prior art tape recorder, showing the relationship between control keys and operative functions.
Figure 2:
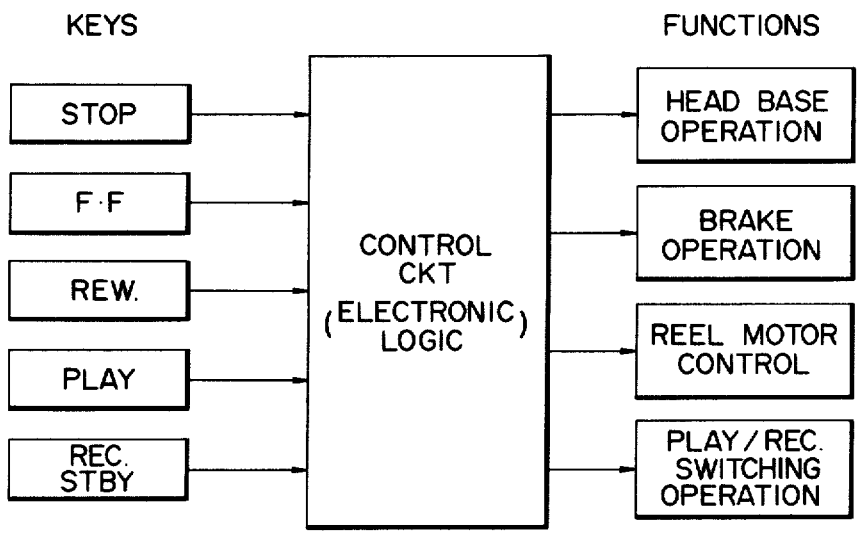
FIG. 2 shows an example of an operation mode switching system for a tape recorder according to this invention, showing the relationship between control keys and operative functions.

FIG. 2 shows an arrangement of an operation mode switching system according to an embodiment of this invention. This arrangement is provided with a REC. STBY. (recording stand-by) key in place of the PAUSE and REC keys of the prior art and thus differs from the prior art system in that the number of operation keys is five.

Table III shows an example of the electronic logic operation for setting functions corresponding to the five operation keys shown in FIG. 2.

TABLE III

| | FUNCTIONS | | | |
|---|---|---|---|---|
| KEYS | HEAD CAR. | BRAKE | REEL MOTOR | PLAY/REC SWITCHING |
| STOP | RELEASE | OPERATE | STOP | PLAYBACK |
| F.F | RELEASE | RELEASE | FAST-FORWARD | PLAYBACK |
| REW | RELEASE | RELEASE | FAST-BACKWARD | PLAYBACK |
| PLAY | OPERATE | RELEASE | SLOW-FORWARD | PLAY OR RECORD |
| REC. STBY. | RELEASE | OPERATE | STOP | RECORD |

In the operation mode switching system of this invention, the recording/playback switching operation by means of the PLAY key is directional. That is, the tape recorder is set to a playback mode if the PLAY key is operated in a stop, fast forward or rewinding mode, while it is set to a recording mode if the PLAY key is operated in a recording-pause mode.

Table IV shows the relationship between the operation keys and operation mode variations.

TABLE IV

| | MODE | | | | | |
|---|---|---|---|---|---|---|
| KEYS | STOP | F.F | REW. | PLAY | RECORD | RECORD PAUSE |
| STOP | STOP | STOP | STOP | STOP | STOP | STOP |
| F.F | F.F | F.F | F.F | F.F | F.F | F.F |
| REW. | REW. | REW. | REW. | REW. | REW. | REW. |
| PLAY | PLAY | PLAY | PLAY | PLAY | REC. | REC. |
| REC. STBY. | REC. PAUSE | F.F | REW. | PLAY | REC. PAUSE | REC. PAUSE |

As is apparent from Table IV, the playback-pause mode setting is omitted in the system of this invention. This is done because, in the actual use of a tape deck, the stop mode can be substituted for the playback-pause mode without any inconvenience. Further, the recording-pause mode may be set by operating the REC. STBY. key alone.

For example, the recording operation may be performed as follows:

(1) When the REC. STBY. key is operated in the stop mode, the tape recorder is set to the recording-pause mode.

(2) When the PLAY key is operated in the recording-pause mode, the tape recorder is set to the recording mode.

(3) When the REC. STBY. key is operated and then the PLAY key is operated as required, the recording-pause and recording modes are repeated alternately.

(4) When the STOP key is operated at the end of the recording, the tape recorder is set to the stop mode.

Thus, the recording operation is enabled by operating the two keys-REC. STBY. and PLAY, which conduces to the simplicity of the construction of the operation mode switching system as well as the ease of such recording operation.

Referring now to FIG. 3, there will be described a practical arrangement of the operation mode switching system according to this invention. Key switches 1 to 5 which are turned on respectively by operating the STOP, REW., F.F., PLAY and REC. STBY. keys are disposed between ground and inverters 6 to 10, respectively. The junctions of corresponding key switches and inverters are connected to a positive power source (+B) via resistors R1 to R5, respectively. Thus, the respective outputs of the inverters 6 to 10, which are normally at a low voltage level, go high when their corresponding key switches are closed. The key switches 1 to 5 may be of the self-restoring type.

The output of the inverter 6 is coupled to the set input S of the flip-flop circuit 11 through an OR gate 39 while the outputs of inverters 7 to 9 are coupled respectively to the set inputs S of flip-flop circuits 12 to 14. The output of the inverter 10 is connected to an input of an AND gate 16 the other inputs of which are coupled with the outputs $\overline{Q}$ of the flip-flop circuits 12 to 14. The output of AND gate 16 is coupled to the set input S of a flip-flop circuit 15 and to an input of the OR gate 39. The output of the inverter 10 is connected also to one input of an AND gate 17 the other input of which is coupled with the output Q of the flip-flop circuit 15. The reset input R of the flip-flop circuit 11 is coupled with the outputs of the inverters 7 to 9, while the reset input R of the flip-flop circuit 12 is coupled with the outputs of inverters 6, 8 and 9 through an OR gate 19. The reset input R of the flip-flop circuit 13 is coupled with the outputs of the inverters 6, 7 and 9 through an OR gate 20, while the reset input R of the flip-flop circuit 14 is coupled with the outputs of the inverters 6 to 8 and the AND gate 17 through an OR gate 21. Further, the reset input R of the flip-flop circuit 15 is coupled with the outputs of the inverters 6 to 8 through an OR gate 22. All the flip-flop circuits 11 to 15 are of the reset-dominant type, and also the flip-flop circuit 11 is of the initial set type which is set when the power supply (not shown) for the tape recorder is turned on for the first time. In the stop mode, the flip-flop circuits 11 to 15 are set when their corresponding key switches are closed, so that their outputs Q go high.

The output Q of the flip-flop circuit 11 is coupled through a driver circuit 23 to the base of a transistor Q1 whose collector is connected to a brake operating plunger 24. When the flip-flop circuit 11 is set, the transistor Q1 is allowed to conduct, causing the plunger 24 to actuate a brake mechanism 25 for braking a supply reel and a take-up reel.

The outputs Q of the flip-flop circuits 12 to 14 are coupled respectively to control terminals F.B. (FAST BACKWARD), F.F. (FAST FORWARD) and S.F. (SLOW FORWARD) of a motor driving circuit 26 for a reversible motor 27 to drive a reel. In the motor driving circuit 26, when one of the control terminals is brought to high voltage level, the reel motor 27 is driven correspondingly to such control terminal. If all the control terminals are at low voltage level, then the motor 27 will stop. It is to be noted that a capstan motor (not shown) is rotating while the power supply for the tape recorder is turned on.

The output Q of the flip-flop circuit 14 is coupled through a driver circuit 28 to the base of a transistor Q2 whose collector is connected to a head carriage driving plunger 29. When the key switch 4 (PLAY) is closed, the flip-flop circuit 4 is set to cause the transistor Q2 to conduct. Consequently, the head carriage driving plunger 28 is energized, thereby operating a head carriage 30 so as to bring magnetic heads into contact with a magnetic tape. When one of the key switches 1, 2 and 3 is closed, the flip-flop circuit 14 is reset, whereby the plunger 29 is deenergized to release the head carriage 29 so as to remove the heads from the tape.

The output Q of the flip-flop circuit 15 is coupled through a driver circuit 31 to the base of a transistor Q3 whose collector is connected to a recording/playback switching plunger 32. When the key switch 5 (REC. STBY.) is closed, the flip-flop circuit 15 is set to cause the transistor Q3 to conduct and to energize the plunger 32. The energization of the plunger 32 switches a recording/reproducing circuit 33, which is operatively coupled to the plunger and normally in a reproducing state, from the reproducing state to a recording state.

As shown in FIG. 3, for example, the recording/reproducing circuit 33 comprises single-pole double-throw switches SW1 to SW4 whose movable contacts are shifted from their respective PLAYBACK positions to RECORD positions by energization of the plunger 32, an oscillator 34 for erasing and record-biasing, a variable capacitor 35 for bias adjustment, and a recording/reproducing amplifier 36. Numeral 37 designates an erasing magnetic head connected to the movable contact of the switch SW1, while 38 denotes a recording/reproducing magnetic head connected to the movable contact of the switch SW3.

In operation of the arrangement of FIG. 3, when the STOP key switch 1 is operated, the flip-flop circuit 11 is set, while the other flip-flop circuits 12 to 15 are reset. Accordingly, the plunger 24 is energized to actuate the brake mechanism 24, and the tape recorder is set to the stop mode. Since the motor driving circuit 26 is supplied with no high-voltage-level control signals from the flip-flop circuits 12, 13 and 14, the reel motor 27 stops. Since the flip-flop circuit 14 is reset, the plunger 29 is deenergized to release the head carriage 30. Moreover, since the flip-flop circuit 15 is reset, the plunger 32 is deenergized, and the recording/reproducing circuit 33 remains in the reproducing state.

When the REW. key switch 2 is operated in the stop mode, the flip-flop circuit 12 is set, while the flip-flop circuit 11 is reset. Consequently, the plunger 24 is deenergized to release the brake operation. A high-voltage-level F.B. signal is applied to the motor driving circuit 26 from the flip-flop circuit 12, so that the reel motor 27 is backward-rotated at a high speed. The head carriage 30 and the recording/reproducing circuit 33 remain as in the stop mode.

When the F.F. key switch 3 is operated, the flip-flop circuit 13 is set, while the other flip-flop circuits 11, 12, 14 and 15 are reset. Then, the brake is released, and a high-voltage-level F.F. signal is applied to the motor driving circuit 26 from the flip-flop circuit 13, whereby the reel motor 27 is forward-rotated at a high speed.

When the PLAY key switch 4 is operated in the stop mode, the flip-flop circuit 14 is set, while the flip-flop circuit 11 is reset. In consequence, the brake 25 is released, and the plunger 29 is energized to advance the head carriage 30 toward the tape. A high-voltage-level S.F. signal is applied to the motor driving circuit 26 from the flip-flop circuit 14, and thus the reel motor 27 is forward-rotated at a low speed. Since the recording-/reproducing circuit 33 remains in the reproducing state, a playback operation is started.

When the REC. STBY. key switch 5 is operated in the stop mode, the flip-flop circuit 15 is set. As a result, the recording/reproducing circuit 33 is switched from the reproducing state to the recording state. The reel motor 27 remains in the stop state. That is, if the REC. STBY. key switch 5 is operated in the stop mode, the tape recorder is set to the recording-pause mode.

When the PLAY key switch 4 is operated in the recording-pause mode, the flip-flop circuit 14 is set, while the flip-flop circuit 11 is reset and the flip-flop circuit 15 remains set. Since the flip-flop circuit 14 is set, the head carriage 30 is actuated to bring the heads into contact with the tape, and the high-voltage-level S.F. signal is applied to the motor driving circuit 26, whereby the motor 27 is forward-rotated at the low speed. That is, if the PLAY key switch 4 is operated in the recording-pause mode, the tape recorder is switched from the recording-pause mode to the recording mode. When the REC. STBY. key switch 5 is again operated in the recording mode, the output of the AND gates 17 and 16 go high to reset the flip-flop circuit 14 and to set the flip-flop circuit 11, respectively. That is, the tape recorder is switched from the recording mode to the recording-pause mode. The AND gate 16 is provided to prevent the flip-flop circuit 15 from being set even if the REC. STBY. key switch 5 is operated in the REW., F.F. or PLAY mode. That is, the flip-flop circuit 5 can be set only in the stop mode.

What is claimed is:

1. An operation mode switching system for a tape recorder having at least stop, recording-pause, recording, and playback modes, comprising:

at least first and second operation members;

first means coupled to said first operation member for setting the tape recorder to the recording-pause mode in response to an operation of said first operation member when the tape recorder is in the stop mode;

second means coupled to said second operation member for setting the tape recorder to the playback mode in response to an operation of said second operation member when the tape recorder is in the stop mode and to the recording mode in response to an operation of said second operation member when the tape recorder is in the recording-pause mode; and third means for setting the tape recorder to the recording-pause mode in response to an operation of said first operation member when the tape recorder is in the recording mode.

2. An operation mode switching system according to claim 1, wherein said first means includes a recording/reproducing circuit which is switched from a reproducing state to a recording state in response to switching from the stop mode to the recording-pause mode of said tape recorder.

3. An operation mode switching system according to claim 1, wherein said tape recorder includes at least one reel motor and a movable head carriage carrying at least one magnetic head; and wherein said second means includes means for forward-rotating a reel motor of the tape recorder at a low speed in response to an operation of said second operation member and means for operating said movable head carriage to bring at least one magnetic head into contact with a magnetic tape when operated.

4. An operation mode switching system according to claim 1 further comprising means for prohibiting said first means from setting the tape recorder to the recording-pause mode irrespective of an operation of said first operation member when the tape recorder is in the playback mode.

5. A tape recorder comprising:
first to fifth operation members;
brake means for braking a supply reel and a take-up reel;
a reel motor capable of slow-forward, fast forward, and fast-backward rotations;
head carriage means for bringing one or more magnetic heads into contact with a magnetic tape when operated;
recording/reproducing circuit means which is normally in a reproducing state; and
control circuit means responsive to an operation of said first member to set the tape recorder to a stop mode in which said brake means is actuated, said reel motor stops and said head carriage means is inoperative; responsive to an operation of said second member in said stop mode to set the tape recorder to a rewinding mode in which said brake means is released, said reel motor backward-rotates at a high speed and said head carriage means is inoperative; responsive to an operation of said third member in said stop mode to set the tape recorder to a fast-forward mode in which said brake means is released, said reel motor forward-rotates at a high speed and said head carriage means is inoperative; responsive to an operation of said fourth member in one of said stop, rewinding and fast-forward modes to set the tape recorder to a playback mode in which said brake means is released, said reel motor forward-rotates at a low speed, said head carriage means is operated, and said recording/reproducing circuit still remains in said reproducing state; responsive to an operation of said fifth member in said stop mode to set the tape recorder to a recording-pause mode in which said brake means remains actuated, said reel motor stops, said head carriage means is inoperative and said recording/reproducing circuit is switched from said reproducing state to a recording state; responsive to an operation of said fourth member in said recording-pause mode to set the tape recorder to a recording mode in which said brake means is released, said reel motor forward-rotates at the low speed, said head carriage means is operated and said recording/reproducing circuit is in said recording state; and responsive to an operation of said fifth member in said recording mode to switch the tape recorder from said recording mode to said recording-pause mode.

6. An operation mode switching system for a tape recorder having at least stop, recording-pause, recording, and playback modes, comprising:
at least first to third operation members;
reel driving means for driving a supply reel and take-up reel;
head means comprising one or more magnetic heads for recording on or reproducing from a magnetic tape;
controlling means operable by control circuit means for controlling contact between said head means and said magnetic tape such that said contact is made when said controlling means is operated and is not made when said controlling means is inoperative;
recording/reproducing circuit means which is normally in a reproducing state; and
control circuit means responsive to an operation of said first member to set the tape recorder to the stop mode in which said reel driving means stops and said controlling means is inoperative; responsive to an operation of said second member in said stop mode to set the tape recorder to the playback mode in which said reel driving means causes the take-up reel to forward-rotate at a low speed, said controlling means is operated, and said recording/reproducing circuit means still remains in said reproducing state; responsive to an operation of said third member in said stop mode to set the tape recorder to the recording-pause mode in which said reel driving means stops, said controlling means is inoperative and said recording/reproducing circuit means is switched from said reproducing state to a recording state; responsive to an operation of said second member in said recording-pause mode to set the tape recorder to the recording mode in which said reel driving means causes the take-up reel to forward-rotate at the low speed, said controlling means is operated and said recording/reproducing circuit means is in said recording state; and responsive to an operation of said third member in said recording mode to switch the tape recorder from said recording mode to said recording-pause mode.

7. An operation mode switching system according to claim 6, wherein said control circuit means further comprises means for prohibiting said second member from setting the tape recorder to the recording-pause mode irrespective of an operation of said second member when the tape recorder is in the playback mode.

8. A tape recorder comprising:
first to fifth operation member;
a supply reel and a take-up reel;
brake means for braking said supply reel and said take-up reel;
reel driving means for driving said supply reel and said take-up reel;

head means comprising one or more magnetic heads for recording on or reproducing from a magnetic tape;

controlling means operable by control circuit means for controlling contact between said head means and said magnetic tape such that said contact is made when said controlling means is operated and is not made when said controlling means is inoperative;

recording/reproducing circuit means which is normally in a reproducing state; and control circuit means responsive to an operation of said first member to set the tape recorder to a stop mode in which said brake means is actuated, said reel driving means stops and said controlling means is inoperative; responsive to an operation of said second member in said stop mode to set the tape recorder to a rewinding mode in which said brake means is released, said reel driving means causes the supply reel to backward-rotate at a high speed and said controlling means in inoperative; responsive to an operation of said third member in said stop mode to set the tape recorder to a fast-forward mode in which said brake means is released, said reel driving means causes the take-up reel to forward-rotate at a high speed, and said controlling means is inoperative; responsive to an operation of said fourth member in one of said stop, rewinding and fast-forward modes to set the tape recorder to a playback mode in which said brake means is released, said reel driving means causes the take-up reel to forward-rotate at a low speed, said controlling means is operated, and said recording/reproducing circuit means still remains in said reproducing state; responsive to an operation of said fifth member in said stop mode to set the tape recorder to a recording-pause mode in which said brake means remains actuated, said reel driving means stops, said controlling means is inoperative and said recording/reproducing circuit means is switched from said reproducing state to a recording state; responsive to an operation of said fourth member in said recording-pause mode to set the tape recorder to a recording mode in which said brake means is released, said reel driving means causes the take-up reel to forward-rotate at the low speed, said controlling means is operated and said recording/reproducing circuit means is in said recording state; and responsive to an operation of said fifth member in said recording mode to switch the tape recorder from said recording mode to said recording-pause mode.

* * * * *